United States Patent
Woolston et al.

(10) Patent No.: US 8,434,820 B2
(45) Date of Patent: May 7, 2013

(54) VEHICLE SEAT WITH SECURING DEVICE FOR A SUPPORT ELEMENT

(75) Inventors: Stuart Woolston, Glasgow (GB); Stefan Flucht, Burscheid (DE); Peter Szegeny, Leverkusen (DE)

(73) Assignee: Johnson Controls GmbH, Burscheid (DE)

( * ) Notice: Subject to any disclaimer, the term of this patent is extended or adjusted under 35 U.S.C. 154(b) by 454 days.

(21) Appl. No.: 12/667,490

(22) PCT Filed: Jul. 2, 2008

(86) PCT No.: PCT/EP2008/005388
§ 371 (c)(1),
(2), (4) Date: May 12, 2010

(87) PCT Pub. No.: WO2009/003690
PCT Pub. Date: Jan. 8, 2009

(65) Prior Publication Data
US 2012/0056456 A1    Mar. 8, 2012

(30) Foreign Application Priority Data

Jul. 5, 2007 (DE) .......................... 10 2007 031 454
Nov. 16, 2007 (DE) .......................... 10 2007 055 081

(51) Int. Cl.
*B60N 2/30* (2006.01)
(52) U.S. Cl.
USPC .......................................... 297/236; 297/234
(58) Field of Classification Search ............. 297/188.09, 297/188.1, 234–236
See application file for complete search history.

(56) References Cited

U.S. PATENT DOCUMENTS

| | | | |
|---|---|---|---|
| 808,679 A | 1/1906 | Pickles | |
| 6,811,200 B2 * | 11/2004 | Shibata et al. | 297/236 |
| 7,014,241 B2 * | 3/2006 | Toyota et al. | 296/37.15 |
| 7,077,474 B2 * | 7/2006 | Satani | 297/236 |
| 7,490,896 B2 * | 2/2009 | Smith | 297/235 |
| 2004/0160080 A1 | 8/2004 | Shibata et al. | |
| 2005/0052044 A1 | 3/2005 | Toyota et al. | |

FOREIGN PATENT DOCUMENTS

| | | |
|---|---|---|
| DE | 19837662 | 4/1999 |
| EP | 1449710 | 8/2004 |
| EP | 1449710 A | 8/2004 |
| EP | 1493624 | 1/2005 |
| EP | 1493624 A | 1/2005 |
| EP | 1498303 | 1/2005 |
| EP | 1498303 A1 | 1/2005 |
| JP | 2002225603 | 8/2002 |
| JP | 2002225603 A | 8/2002 |
| WO | WO2009105903 | 2/2009 |

OTHER PUBLICATIONS

Patent Treaty Cooperation, International Search Report, PCT/US09/57868, Nov. 20, 2009.
Patent Treaty Cooperation, Written Opinion of the International Searching Authority, PCT/US09/57868, Nov. 20, 2009.
Patent Treaty Cooperation, International Preliminary Report on Patentability [English Translation, PCT/EP08/006365, Apr. 10, 2010].
European Search Report; 10 pages.

* cited by examiner

*Primary Examiner* — Peter R. Brown
(74) *Attorney, Agent, or Firm* — Butzel Long

(57) ABSTRACT

The invention discloses a vehicle seat with a stowable central segment seat part. The central segment seat part is supported by means of a support element on an additional seat part and is adjustable in a longitudinal direction relative to said additional seat part. The support element is thereby secured against unwanted movement by means of at least one securing device.

4 Claims, 5 Drawing Sheets

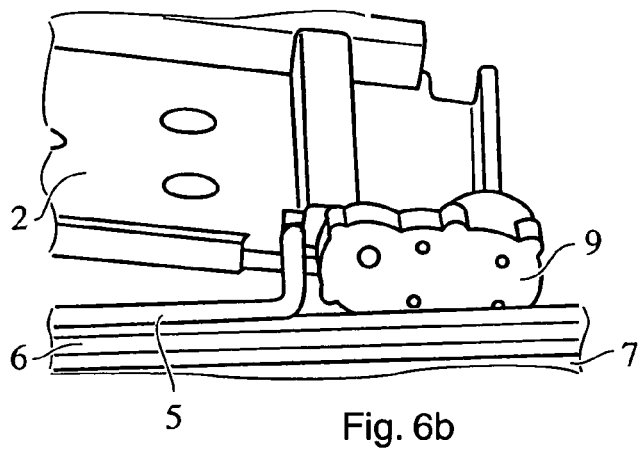
Fig. 6b
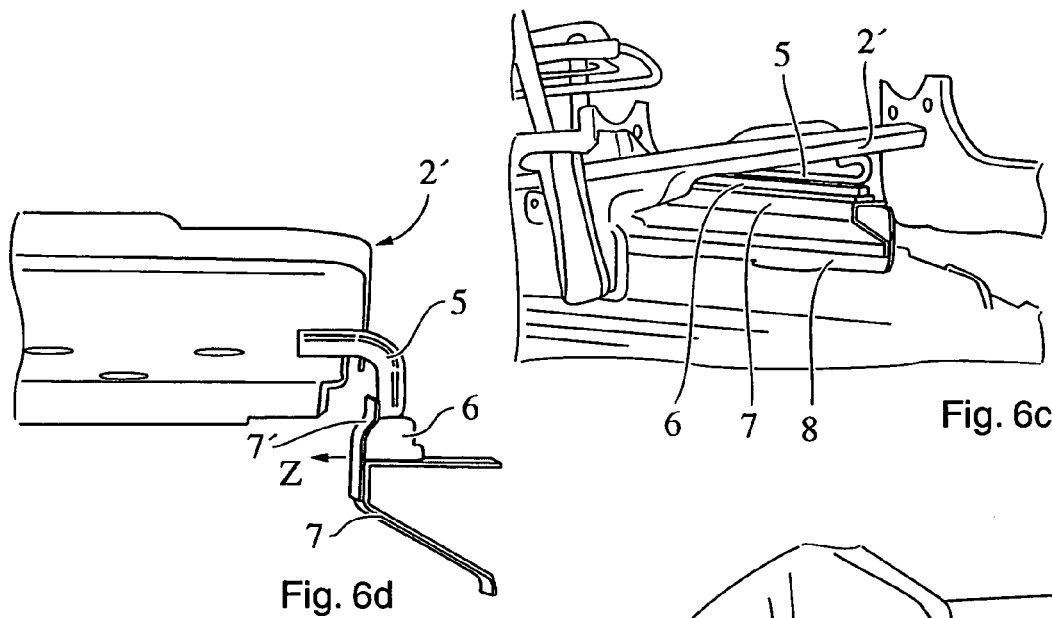
Fig. 6c
Fig. 6d
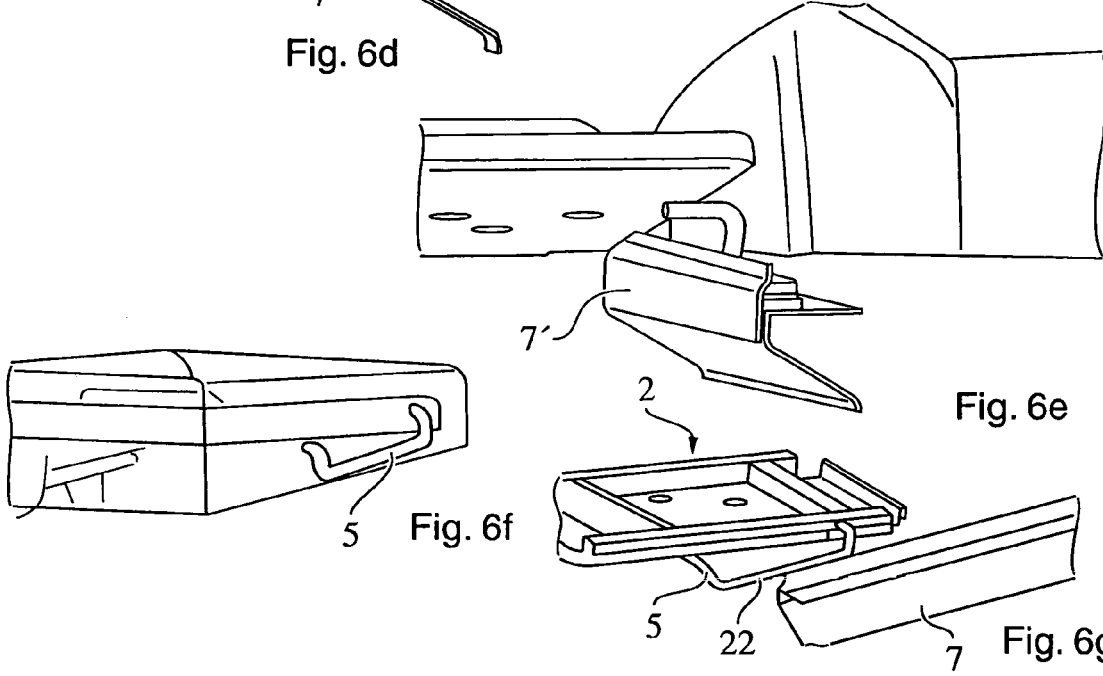
Fig. 6e
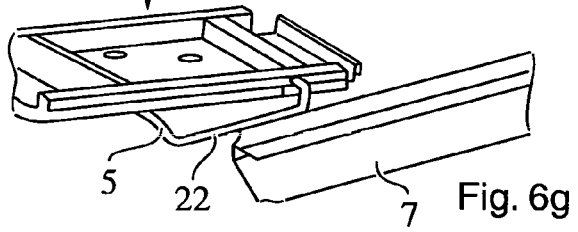
Fig. 6f
Fig. 6g

VEHICLE SEAT WITH SECURING DEVICE FOR A SUPPORT ELEMENT

BACKGROUND

The present disclosure relates to a vehicle seat that can be moved between a stowage position and a position of use (i.e., use position).

Vehicle seats are generally known from the prior art. In the hitherto unpublished German patent application DE 10 2007 013 376.8, for example, a Vehicle seat is disclosed with a stowable central seat part. The German patent application DE 10 2007 013 376.8 is used as a reference and its disclosure is incorporated herein by reference to form part of the present disclosure. In the European patent application publication EP 1 449 710 A2, a vehicle seat is also disclosed with a stowable seat part of a central segment and a leg supporting the seat part of the central segment. The leg is fastened onto the seat structure in a foldable manner and is supported in the position of use on the vehicle floor. To this end, the foldable leg has a long, and thus unstable, strut in the vertical direction and is additionally susceptible to wear and is unsteady as a result of the folding mechanism. The known support elements for the central segment have drawbacks that they slide away or give way, in particular during a sudden acceleration of the vehicle, such as may occur in a vehicle crash.

Accordingly, there remained a need for an improved vehicle seat having a central segment seat part and a supporting element.

SUMMARY

In on exemplary embodiment, there is disclosed a vehicle seat having at least one first segment, a second segment and a central segment, all segments respectively making up a seat part. The seat part of the central segment (central segment seat part) is able to be stowed under the seat part of the first segment when the vehicle seat is located in a stowage position. In the one exemplary embodiment, the central segment is connected to the first segment in a position of use and is in contact with the second segment via a support element. The central segment has the support element. The support element is secured relative to a movement in a Z-direction and a Y-direction by means of at least one securing device.

It was extremely surprising and unexpected to a person skilled in the art that the support element is retained by at least one securing device relative to a movement in a Z-direction and a Y-direction, even in the event of rapid change in acceleration such as may occur during a vehicle crash.

In one exemplary embodiment, the at least one securing device preferably includes a first securing device and a second securing device.

The first securing device prevents a movement of the support element in the Y-direction, i.e. a movement substantially perpendicular to the seat surface of the central segment seat part. Further, a second securing device prevents a movement of the support element in the Z-direction, i.e. a movement transversely to the longitudinal extension of the central segment seat part. Even in the event of a rapid change in acceleration such as may occur during a vehicle crash, the support element thus remains substantially in the same position relative to the second segment. Advantageously, as a result, an undesired lowering of the central segment seat part relative to the seat part of the second segment or a collapse in the direction of the first segment may be prevented.

The first and the second segment respectively include, on the one hand, one respective seat part and, on the other hand, one respective backrest. The central segment is arranged between the first and the second segment and also comprises a seat part and a backrest. The central segment seat part and the backrest of the central segment are, however, preferably configured to be narrower than those of the first or second segment and/or the backrest of the central segment is configured to be collapsible.

The seat structure of the central segment comprises the support element on the side towards the second segment. The seat structure of the central segment is further preferably connected via a hinge to the seat part of the first segment and may be adjusted longitudinally in combination therewith. The central segment seat part additionally may be folded in the direction of the seat part of the first segment, in order to be stowed below the seat part thereof (stowage position). The hinge also stabilizes and/or holds, however, the side of the central segment seat part adjacent to the first segment. The opposing side of the central segment seat part is supported via the support element on the second segment. The support element is preferably in contact with the seat structure of the second segment.

By the term "seat structure of a seat part" is preferably intended to be understood both the supporting structure of the cushion carrier and also any fastening rails, supports or other sub-structures of the vehicle seat.

In one exemplary embodiment, the support element creates with the first and/or with the second securing devices in the position of use (i.e., use position) a positive and/or non-positive connection. Initially a positive and/or non-positive connection between the first securing device and the support element has to be released, before a positive and/or non-positive connection between the second securing device and the support element may be released. In one exemplary embodiment, only when there is no longer a positive and/or non-positive connection between the support element and the securing device can the central segment seat part preferably be transferred to the stowage position. By the positive and/or non-positive connection between the securing device and the support element, the support element is preferably prevented from moving in the Z-direction and Y-direction, two securing devices having to be released for leaving the position of use. By the term "a position of use of the central segment seat part" is preferably intended to be understood when a vehicle occupant is able to be seated thereon. In this exemplary embodiment, the backrest of the central segment is substantially upright on the central segment seat part, so that the occupant may lean against the backrest.

In one exemplary embodiment, the seat structure of the second segment has a guide rail in which a slide may be guided. The slide, in turn, preferably includes the securing device. The support element is thus in contact with the slide by the positive and/or non-positive connection to the securing device. By means of the slide and the guide rail, the central segment seat part and the seat part of the second segment are able to be longitudinally adjusted relative to one another. If, for example, the seat part of the first segment is longitudinally adjusted, as a result of the connection with the hinge, the central segment seat part is adjusted accordingly therewith and slides along with the slide in the guide rail. As a result, a longitudinal adjustment relative to the seat part of the second segment is achieved.

In one exemplary embodiment, the positive and/or non-positive connections between the support element and the securing device may preferably only be released relative to one another in a predetermined position of the seat parts. In addition, or alternatively, the connection may be released by the actuation of an additional actuator (or actuating means).

Without the use of an actuating means, it has to be ensured relative to the predetermined position to be adopted that the position may not be inadvertently adopted. For example, it is possible that the positive and/or non-positive connections are only released when all three seat parts have the same predetermined longitudinal adjustment and/or additionally an actuating means is actuated. Such an actuator may, for example, be a handle which is connected to a Bowden cable, which deactivates a locking mechanism. As a result of the predetermined position to be adopted and/or the actuating means it is advantageously prevented that the securing of the support element is undesirably released.

In one exemplary embodiment, the support element in a first embodiment is preferably fork-shaped with a recess. The second securing device is preferably configured as a bolt having a head (such as a mushroom-head shaped bolt) and the recess of the fork-shaped support element encompasses the head of the bolt. The head of the bolt thus prevents a movement of the support element transversely to the longitudinal extension of the seat part (Z-direction) as the recess may not be displaced beyond the head.

In one exemplary embodiment, the support element preferably includes a lug which cooperates with the first securing device in the position of use. The first securing device is thus preferably a rotatable double cam with a first and a second cam part. The first cam part thus cooperates positively and/or non-positively with the lug of the support element and prevents a movement substantially perpendicular to the seat surface of the seat part (Y-direction). The second cam part preferably cooperates with the guide rail and is preferably pretensioned by a spring means in the direction of the guide rail. If the central segment seat part is to be displaced in the position of use, by the connection between the support element and the securing device the slide is moved within the guide rail. As a result, the adjustment of the central segment seat part is particularly smooth-running and at the same time the central segment seat part is optimally supported.

For an adjustment from a position of use into a stowage position, the central segment seat part and the seat part of the second segment are preferably moved relative to one another into the predetermined position. In this position, the second cam part may engage in a groove of the guide rail, whereby the entire double cam rotates away from the support element. As a result, there is no longer the positive and/or non-positive connection between the first cam part and the lug of the support element. The central segment seat part may thus be raised together with the support element and folded in the direction of the seat part of the first segment. The position of the groove in the guide rail is thus dependent on the predetermined position to be selected. Two grooves or a plurality of grooves in the guide rail are also conceivable, by which two predetermined positions or a plurality of predetermined positions are possible for transferring to the stowage position.

In a further exemplary embodiment of the present disclosure, the support element is configured as a leg, the support element being supported by a contact region on a strip of the vehicle seat. The strip is preferably fastened to the seat structure of the seat part of the second segment. Whatever the longitudinal adjustment of the seat parts of the second segment and of the central segment relative to one another in the position of use, approximately half of the contact region of the support element is always on the strip. If, for example, the seat part of the second segment is moved into the rearmost position of longitudinal adjustment and the central segment seat part together with the seat part of the first segment is moved into the frontmost position of longitudinal adjustment, approximately half of the contact region of the support element still bears on the strip on the second segment. As a result, the central segment seat part is securely supported in each position of the seat parts relative to one another, whereby an inadvertent lowering or tilting of the central segment seat part is prevented. Additionally, damage to the support element by too small a bearing surface of the contact region and the resulting large forces by lever action is reduced.

In one exemplary embodiment, the length of the contact region preferably corresponds approximately to half of the length of the seat structure of the second segment. The length of the horizontally extending contact region is preferably substantially greater than the leg structure of the vertically extending support element. The strip also preferably has a length which corresponds approximately to the length of the seat structure of the second segment.

In one exemplary embodiment, the seat structure of the second segment preferably includes a retaining element and the retaining element in turn comprises the strip.

In one exemplary embodiment, the strip preferably has damping properties so that any troublesome rattling noise is not produced, when the support element—for example during the operation of the vehicle—strikes the strip. Furthermore, the strip preferably has material properties which facilitate the sliding of the contact region on the strip. Thus, advantageously, the adjustment of the central segment seat part or of the seat part of the second segment is more smooth-running.

In one exemplary embodiment, the retaining element preferably has a substantially U-shaped configuration, the support element with its contact region substantially bearing on the strip in the region of the bending point (or bight portion) of the U-shaped retaining element. The bending point has an increased stability due to its geometry and/or a material thickness, so that even when a large force acts on the support element and thus on the retaining element, no damage occurs to the retaining element.

In the one exemplary embodiment, the support element is preferably secured by a securing device. In this exemplary embodiment the securing device is preferably a wall-like component, for example a metal sheet, which is in contact with the retaining element. By the securing device it is prevented that the support element slips off the strip in the Z-direction. Further preferably, the support element protrudes laterally from the seat structure of the central segment seat. The support element is thus, nevertheless, covered by the upholstered parts of the central segment seat part and of the seat part of the second segment, so that there is reduced risk of contact with vehicle occupants. By the projecting support element, however, the support element may advantageously also be used as a handle when the central segment seat part is to be transferred into the stowage position.

Preferably, the vehicle seat according to the exemplary embodiments is used as a rear seat bench in a vehicle. Quite particularly preferably, the vehicle seat according to the disclosure may be provided as a central seat bench in a vehicle with three vehicle seat rows.

The exemplary embodiments of the disclosure are described hereinafter with reference to the figures. The explanations are merely provided by way of example and do not limit the general inventive idea.

FIGS. 5*a* to 5*d* show schematically a first embodiment of the vehicle seat with a securing device.

FIGS. 6a to 6g show schematically a second embodiment of the vehicle seat with a leg as a support element.

DETAILED DESCRIPTION

Figure 1:
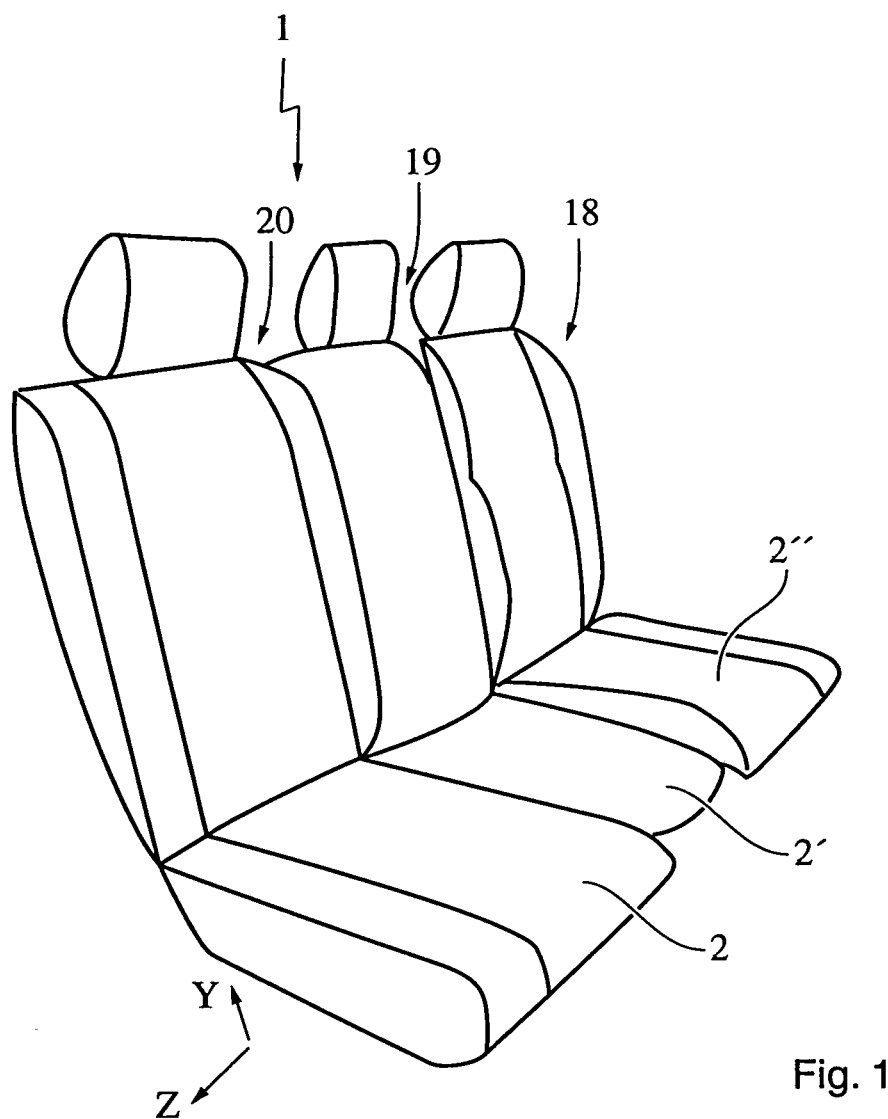
FIG. 1 shows schematically a vehicle seat.

In FIG. 1 a vehicle seat 1 is shown schematically in a position of use (i.e., use position), preferably being a non first row (or rear) seat bench of a motor vehicle. The vehicle seat 1 comprises a first segment 20, a second segment 18 and a central segment 19. Each segment 18, 19, 20 preferably has a seat part 2", 2', 2 and a backrest.

Figure 2:
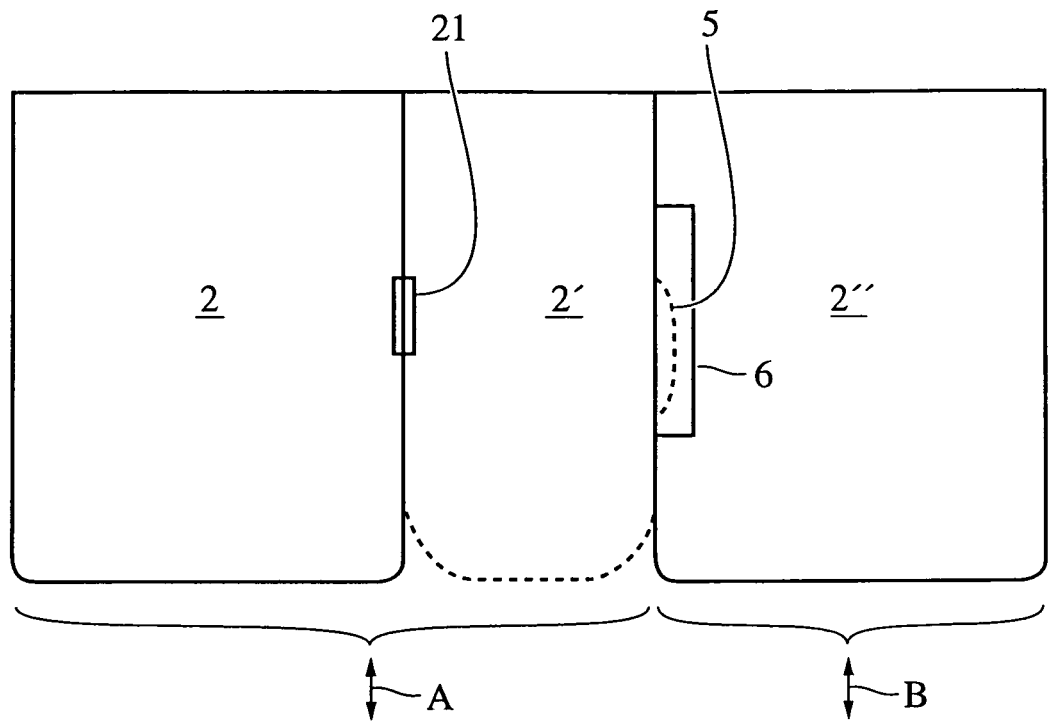
FIG. 2 shows schematically seat parts of the vehicle seat.

As shown schematically in FIG. 2, the central segment seat part 2' is connected by means of a schematically shown pivoting mechanism 21 to the seat part 2 of the first segment 20. If the seat part 2 of the first segment 20 is displaced, for improving comfort, longitudinally to the front or to the rear—as shown by the arrow A—the central segment seat part 2' is displaced therewith. The seat part 2" of the second segment 18 may be displaced to the front or to the rear (arrow B) substantially independently of the displacement of the central segment seat part 2' and of the seat part 2 of the first segment 20. So that the central segment seat part 2' is nevertheless supported by the seat part 2" and/or the seat structure of the second segment 18, the central segment seat part 2' in FIG. 2 has a support element 5. The support element 5 in this case in this embodiment (see the exemplary embodiment of FIGS. 6a to 6g) bears against a strip 6. If the central segment seat part 2' and/or the seat part 2" of the second segment 18 is displaced, the support element 5 is displaced on the strip 6 and/or the strip 6 is displaced.

Figure 3:
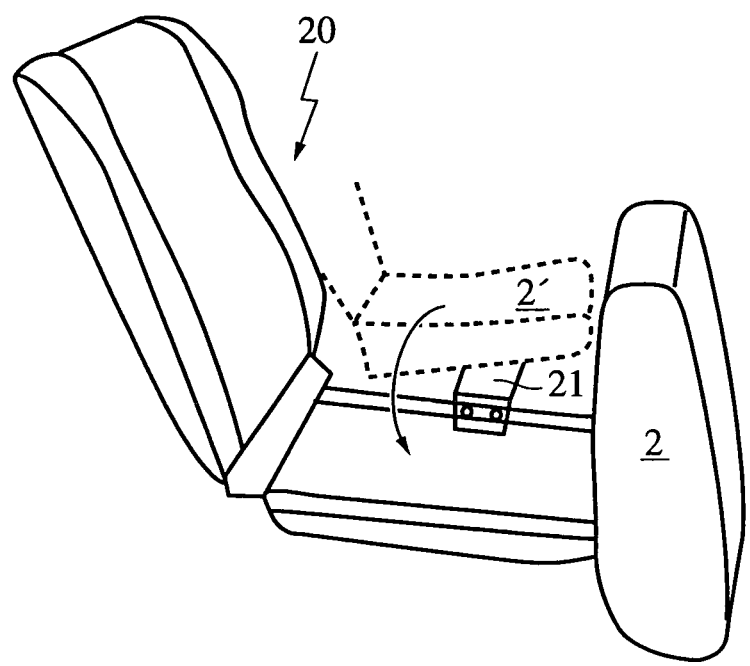
FIG. 3 shows schematically a first segment of the vehicle seat and a central segment seat part.

Schematically shown in FIG. 3 is the first segment 20 and the central segment seat part 2'. The seat part 2 of the first segment 20 has been folded vertically, so that a stowage space present below the seat part 2 is accessible. In this stowage space, therefore, the central segment seat part 2' may be folded by means of the pivoting mechanism 21. The pivoting mechanism 21 is, for example, a hinge which supports and/or holds the central segment seat part in the position of use at least on one side and connects the central segment seat part to the seat part 2 of the first segment 20.

Figure 4:
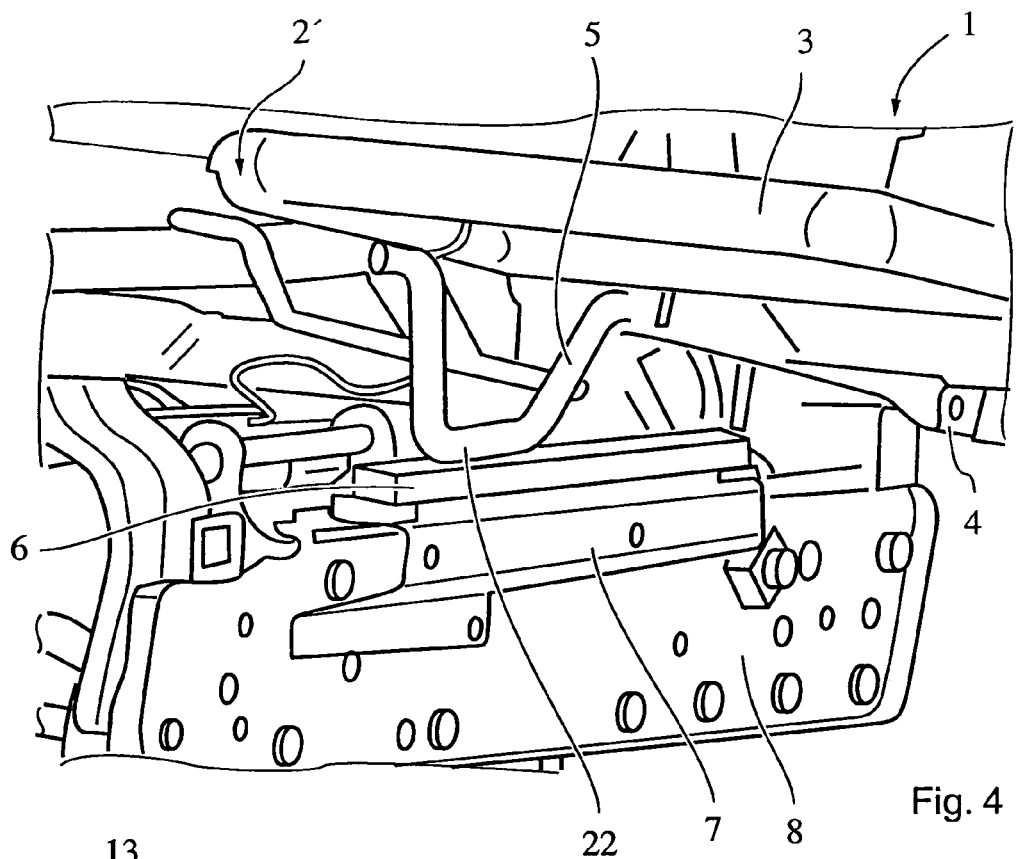
FIG. 4 shows schematically a vehicle seat according to the prior art.

In FIG. 4 a vehicle seat 1 is shown schematically. It consists of a seat part 2' folded away to the side, of which the tubular structure 3 is shown in FIG. 4. On the side member of the tubular structure 3 opposing the joint 4, a leg is arranged as a support element 5, which is welded to the tubular structure 3 with its limbs protruding upwards. The underside of the leg 5 bears displaceably on a damping strip 6 made of plastics material or elastomer, which is connected via a metal mounting 7 to the support 8 of the vehicle seat 1. The mounting 7 may thus also be denoted as a retaining element 7, and the damping strip 6 as a strip 6. The substructure 8, the mounting 7 and the strip 6 form a seat structure, with or without other parts. The contact region 22 of the leg 5 is configured to be very short according to the prior art, so that in specific positions of the central segment seat part 2' relative to the seat part 2" of the second segment 18, the contact region 22 hardly bears against the strip 6. If, for example, the central segment seat part 2' is displaced in its frontmost position of longitudinal adjustment and the seat part 2" of the second segment 18 is displaced in its rearmost position of longitudinal adjustment (statically disadvantageous seat setting), the contact region 22 hardly bears against the strip 6. In this case, the central segment seat part 2' may not be securely supported by the leg 5. This already known vehicle seat 1 is thus intended to be improved according to the disclosure. In FIGS. 5a to 5d, a first improved vehicle seat 1 is shown. FIGS. 6a to 6g relate to a further embodiment of the disclosure.

Figure 6A:
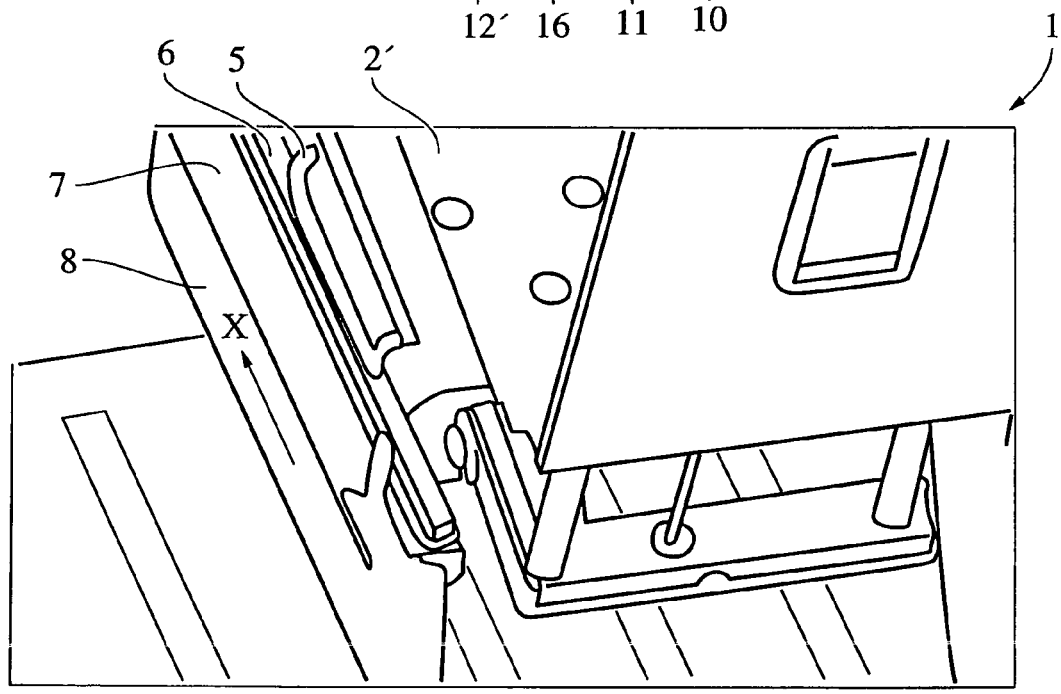

In the exemplary embodiment shown in FIGS. 6a to 6g, the seat structure is intended to correspond substantially to the already known vehicle seat of FIG. 4. As visible from FIGS. 6a, 6g and 6f, however, the length (dimension in the X-direction) of the leg 5 (as support element 5) and thus the largest possible bearing surface and/or the largest possible contact region 22 on the damping strip 6 has been lengthened to approximately 40 to 60%, in particular approximately 50% of the length of the seat structure of the seat part 2" of the second segment 18. The damping strip 6 and leg 5 are dimensioned relative to one another such that even with a statically disadvantageous seat setting, at least half of the leg 5 bears against the damping strip 6, but protrudes to the side beyond the seat part 2 (FIG. 6f, 6d). The damping strip 6 extends substantially over the entire length of the support 8. The welding of the leg 5 is carried out such that no collision occurs with a gear mechanism 9 of the seat adjuster (FIGS. 6a, 6b). The rear end of the leg 5 is thus inserted and welded from the side into a recess of the structure of the seat part 2, whilst the front end of the leg 5 is bent transversely to the seat direction and is welded from below to the structure. A mounting and/or a retaining element 7 consists of a U-shaped angled metal sheet, on the limbs thereof the leg 5 bears in the vicinity of the base of the "U" on the strip 6. A metal sheet 7' of the mounting 7 engaging behind the leg 5 secures the support against the slipping of the leg 5 in the Z-direction. The metal sheet 7' may, therefore, also be denoted as a securing device 7'. The retaining element 7, the securing device 7', the strip 6 and the support 8 are preferably attached to the seat structure of the second segment 18 or form the seat structure.

Figure 5A:
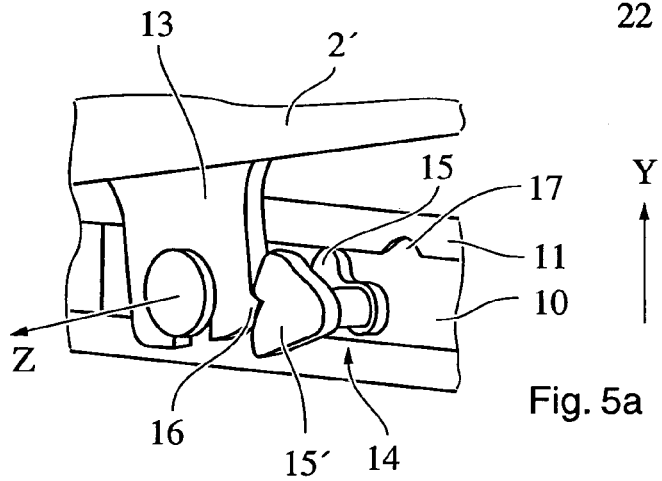
Figure 5B:
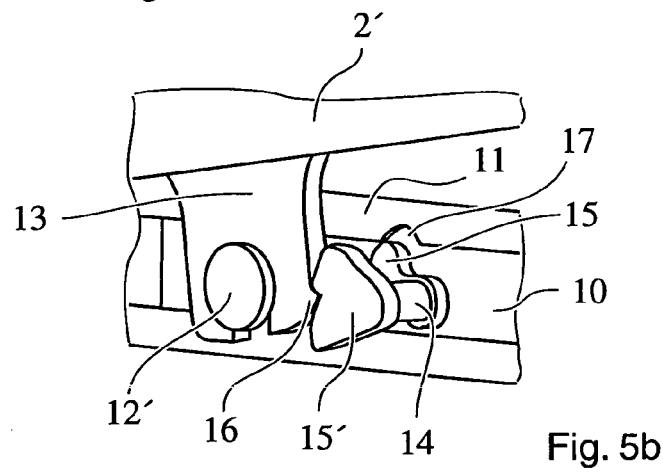
Figure 5C:
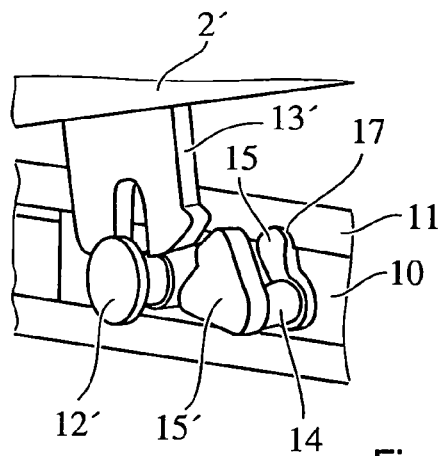
Figure 5D:
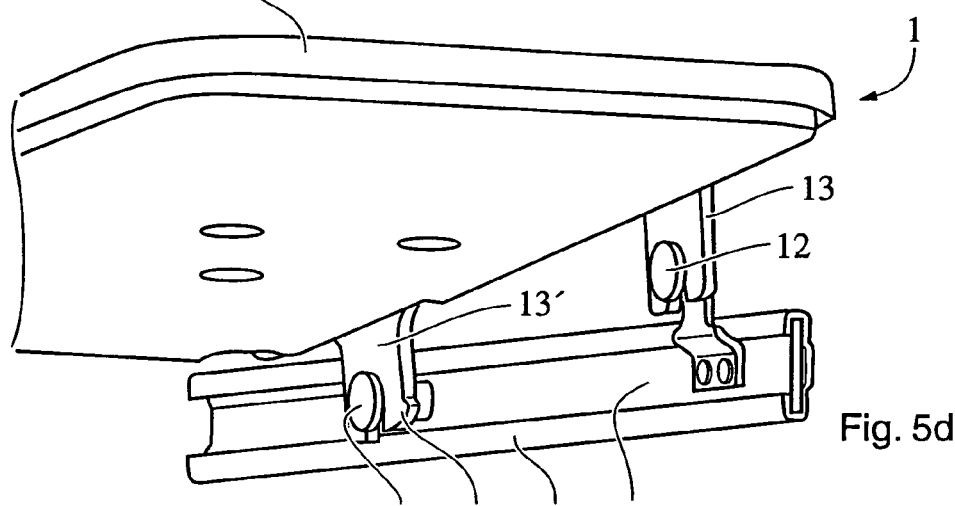

In a further embodiment of the disclosure according to FIGS. 5a to 5d, the seat part 2' of the central segment 19 of the vehicle seat 1 on the relevant side is releasably guided on a slide 10 of a rail 11 and connected therewith via mushroom-heads 12, 12' projecting laterally from the slide 10 (FIG. 5d). On the shanks of these mushroom-heads 12, 12', forks 13, 13' of the seat part 2' of the central segment 19 are positioned and releasably secured by the locking system shown in FIGS. 5a to 5c. The rail 11 may also be denoted as a guide rail 11, and is preferably arranged on the seat structure of the second segment 18. The forks 13, 13' may also be denoted as a support element 13, 13' and are preferably connected to the seat structure of the central segment seat part 2'. As a result of the heads of the mushroom-heads 12, 12', the forks 13, 13' are prevented from moving in the Z-direction, so that the mushroom-heads 12, 12' may be denoted as a second securing device 12, 12'.

The rail 11 has an approximately C-shaped form and encompasses the slide 10, which is formed substantially as a flat profile which stands upright. On the slide 10, in the vicinity of the rear mushroom-head 12' a double cam 14 is rotatably mounted about a horizontal axis, a first cam part 15 being tensioned against the rail 11, whilst a second cam part 15' bears from above on a lug 16 of the fork 13', and locks the fork on the mushroom-head 12' (FIG. 5a). The lug 16 and the first cam part 15 create, therefore, a positive and/or non-positive connection and prevent a movement of the fork 13' in the Y-direction. In a predetermined sliding position of the vehicle seat (FIG. 5b), and/or of the central segment seat part 2' and of the seat part 2" of the second segment 18, the first cam part 15, for example, is driven by a spring means, overlapping a groove 17 in the rail 11 so that the double cam 14 may be rotated into a position releasing the fork 13' (FIG. 5c). The central segment seat part 2' may now be folded to the side. When repositioning the central segment seat part 2' and adjusting the slide 10 in the rail 11 the system is automatically locked.

The invention claimed is:

1. A vehicle seat comprising:
a first segment, a second segment and a central segment; the first segment, the second segment and the central segment respectively comprising a seat part;
wherein the seat part of the central segment is stowed under the seat part of the first segment when the vehicle seat is in a stowage position;
wherein the central segment is connected to the first segment when the vehicle seat is in a use position, the central segment comprising a support element for contacting the second segment when the vehicle seat is in the use position;
wherein the support element, when the vehicle seat is in the use position, is secured with a first securing device on the second segment proximal to a backrest of the second segment and a second securing device on the second segment distal to the backrest of the second segment, such that one of the first securing device and the second securing device create a positive connection with the support element, the positive connection being releasable when the seat part is in a predetermined position and when an actuator is actuated; and
wherein the support element, when the vehicle seat is in a use position, is secured relative to a movement in a lateral direction, from the first segment toward the second segment or reverse, and to a movement in a vertical direction, from an upper surface of a seat part to a bottom surface of a seat part or reverse.

2. A vehicle seat comprising:
a first segment, a second segment and a central segment; the first segment, the second segment and the central segment respectively comprising a seat part;
wherein the seat part of the central segment is stowed under the seat part of the first segment when the vehicle seat is in a stowage position;
wherein the central segment is connected to the first segment when the vehicle seat is in a use position, the central segment comprising a fork-shaped support element for contacting the second segment when the vehicle seat is in the use position;
wherein the fork-shaped support element, when the vehicle seat is in the use position, is secured with a first securing device on the second segment proximal to a backrest of the second segment and a second securing device on the second segment distal to the backrest of the second segment, such that the second securing device creates a positive connection with the fork-shaped support element via a recess in the fork-shaped support element at least partially encompassing a head of the second securing device; and
wherein the fork-shaped support element, when the vehicle seat is in a use position, is secured relative to a movement in a lateral direction, from the first segment toward the second segment or reverse, and to a movement in a vertical direction, from an upper surface of a seat part to a bottom surface of a seat part or reverse.

3. A vehicle seat comprising:
a first segment, a second segment and a central segment; the first segment, the second segment and the central segment respectively comprising a seat part;
wherein the seat part of the central segment is stowed under the seat part of the first segment when the vehicle seat is in a stowage position;
wherein the central segment is connected to the first segment when the vehicle seat is in a use position, the central segment comprising a support element for contacting the second segment when the vehicle seat is in the use position;
wherein the support element, when the vehicle seat is in the use position, is secured with a first securing device on the second segment and second securing device on the second segment, the second securing device comprising a double cam rotatably mounted on a slide, the double cam having a first cam part for cooperating positively with a lug of the support element and a second cam part for cooperating with a groove in a guide rail along which the slide is guidable into and out of a position where the support element can be released; and
wherein the support element, when the vehicle seat is in a use position, is secured relative to a movement in a lateral direction, from the first segment toward the second segment or reverse, and to a movement in a vertical direction, from an upper surface of a seat part to a bottom surface of a seat part or reverse.

4. The vehicle seat of claim 3 wherein the second cam part is pretensioned in the direction of the guide rail.

* * * * *